United States Patent
Jung et al.

(10) Patent No.: US 10,713,397 B2
(45) Date of Patent: Jul. 14, 2020

(54) METHOD AND APPARATUS FOR MODELING A TARGET OBJECT BASED ON PARTICLES

(71) Applicant: Samsung Electronics Co., Ltd., Suwon-si (KR)

(72) Inventors: Hwiryong Jung, Seoul (KR); Nahyup Kang, Seoul (KR); Hyong Euk Lee, Suwon-si (KR); Jiyeon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 14/919,184

(22) Filed: Oct. 21, 2015

(65) Prior Publication Data
US 2016/0117428 A1  Apr. 28, 2016

(30) Foreign Application Priority Data

Oct. 24, 2014  (KR) ........................ 10-2014-0145052

(51) Int. Cl.
*G06F 30/20* (2020.01)
*G06T 13/00* (2011.01)
(Continued)

(52) U.S. Cl.
CPC .......... *G06F 30/20* (2020.01); *G06F 2111/10* (2020.01); *G06T 13/00* (2013.01); *G06T 13/60* (2013.01); *G06T 2210/56* (2013.01)

(58) Field of Classification Search
CPC .. G06F 2217/16; G06F 30/20; G06F 2111/10; G06T 13/60; G06T 13/00; G06T 2210/56
See application file for complete search history.

(56) References Cited

U.S. PATENT DOCUMENTS

| | | | |
|---|---|---|---|
| 7,756,693 B2 * | 7/2010 | Shima | G06F 30/20 703/6 |
| 8,289,327 B1 * | 10/2012 | Horvath | G06T 13/60 345/428 |

(Continued)

FOREIGN PATENT DOCUMENTS

| | | | |
|---|---|---|---|
| JP | 2013-65231 A | 4/2013 | |
| JP | 2014-81900 A | 5/2014 | |

(Continued)

OTHER PUBLICATIONS

Li et al. "Meshfree Particle Methods." Chapter 2, ISBN 978-3-540-22256-9 (2007): Springer [retrieved on Dec. 1, 2017]. Retrieved from <https://link.springer.com/book/10.1007%2F978-3-540-71471-2>.*

(Continued)

*Primary Examiner* — Rehana Perveen
*Assistant Examiner* — Alfred B Wechselberger
(74) *Attorney, Agent, or Firm* — NSIP Law (57) ABSTRACT

Provided is a method of modeling a target object, the method including obtaining information about the target object including an arrangement of particles including target particles, generating coarse particles by down-sampling the target particles, modeling a movement of the target object based on the coarse particles, and redefining the target particles based on a result of the modeling.

17 Claims, 9 Drawing Sheets

(51) Int. Cl.
*G06T 13/60* (2011.01)
*G06F 111/10* (2020.01)

(56) References Cited

U.S. PATENT DOCUMENTS

| | | | |
|---|---|---|---|
| 8,760,449 | B1 | 6/2014 | Horvath |
| 8,996,337 | B1* | 3/2015 | Muller-Fischer ....... G06T 13/20 703/2 |
| 9,811,941 | B1* | 11/2017 | Hankins .................. G06T 15/08 |
| 2004/0062420 | A1 | 4/2004 | Rohaly |
| 2011/0032255 | A1* | 2/2011 | Favier ................. G06F 17/5009 345/420 |
| 2011/0282641 | A1 | 11/2011 | Xenos et al. |
| 2012/0123754 | A1* | 5/2012 | Bodin ................. G06F 17/5018 703/2 |
| 2012/0284002 | A1* | 11/2012 | McDaniel ........... G06F 17/5009 703/2 |
| 2014/0195212 | A1* | 7/2014 | Ogasawara ......... G06F 17/5009 703/2 |
| 2015/0227651 | A1* | 8/2015 | Gowaikar ........... G06F 17/5009 703/2 |
| 2016/0210384 | A1* | 7/2016 | Stomakhin .............. G06F 30/20 |

FOREIGN PATENT DOCUMENTS

| | | | | |
|---|---|---|---|---|
| KR | 10-0872434 B1 | | 12/2008 | |
| KR | 10-2011-0104637 A | | 9/2011 | |
| WO | WO2010121085 | * | 10/2010 | ............. G06T 17/00 |

OTHER PUBLICATIONS

Liu et al. "Smoothed Particle Hydrodynamics: a meshfree particle method." Chapters 1-2, ISBN 981-238-456-1 (2003): World Scientific [retrieve on Nov. 3, 2017]. Retrieved from STIC.*

Harlow, F. "The Particle-In-Cell Method for Numerical Solution of Problems in Fluid Dynamics." (1962): Los Alamos National Laboratory [retrieved on Dec. 2, 2017]. Retrieved from <https://www.osti.gov/scitech/servlets/purl/4769185>.*

Adams, et al. "Adaptively Sampled Particle Fluids." ACM Transactions on Graphics, vol. 26, No. 3, Article 48 (2007) [retrieved on Dec. 2, 2017]. Retrieved from <https://dl.acm.org/citation.cfm?id=1276437>.*

Muller, et al. "Particle-Based Fluid Simulation for Interactive Applications." Eurographics/SIGGRAPH Symposium on Computer Animcation (2003) [retrieved on Nov. 3, 2017]. Retrieved from <https://dl.acm/org/citation.cfm?id=846298>.*

Desburn, et al. "Smoothed Patricles: A new paradigm for animating highly deformable bodies." Computer Animation and Simulation '96, pp. 61-76: SpringerWienNewYork [retrieved on Nov. 3, 2017]. Retreived from <https://link.springer.com/chapter/10.1007/978-3-7091_5>.*

Bridson et al. "Fluid Simulation SIGGRAPH 2006 Course Notes" Chapter 3 [retrieved on Feb. 26, 2019]. Retrieved from <https://dl.acm.org/citation.cfm?id=1185730> (Year: 2006).*

Thurey et al. "Detail-Preserving Fluid Control" ACM SIGGRAPH Symposium on Computer Animation, pp. 7-13 [retrieved on Feb. 26, 2019]. Retrieved from <https://dl.acm.org/citation.cfm?id=1218066> (Year: 2006).*

Ihmsen et al. "SPH Fluids in Computer Graphics" EUROGRAPHICS 2014 [retrieved on Aug. 30, 2018]. Retrieved from <https://diglib.eg.org/handle/10.2312/egst.20141034.021-042> (Year: 2014).*

Cornelis et al. "IISPH-FLIP for incompressible fluids" EUROGRAPHICS 2014, vol. 33, No. 2, pp. 255-262 [retrieved on Aug. 30, 2018]. Retrieved from <https://dl.acm.org/citation.cfm?id=2771467> (Year: 2014).*

Feng et al. "A Deformation Transformer for Real-Time Cloth Animation" ACM Transactions on Graphics, vol. 29, Iss. 4, Article No. 108 [retrieved on Jan. 5, 2019]. Retrieved from <https://i.cs.hku.hk/~yzyu/publication/dtcloth-sig2010.pdf> (Year: 2010).*

Atencio et al. "A Collision Detection and Response Scheme for Simplified Physically Based Animation" SIBGRAPI '05 [retrieved on Jun. 1, 2018]. Retrieved from <https://ieeexplore.ieee.org/document/1599116> (Year: 2005).*

Pauly et al. "Spectral Processing of Point-Sampled Geometry" SIGGRAPH '01, pp. 379-386 [retrieved on Feb. 27, 2019]. Retrieved from <https://dl.acm.org/citation.cfm?id=383301> (Year: 2001).*

Fraedrich et al. "Efficient High-Quality Volume Rendering of SPH Data" IEEE Transactions on Visualization and Computer Graphics, vol. 16, No. 6, pp. 1533-1540 [retrieved on Sep. 14, 2019]. Retrieved from <https://ieeexplore.ieee.org/document/5613495> (Year: 2010).*

Karavasileiadis et al. "Modeling Particles Systems in Java 3D" Basic Studies in Natural Sciences, 4th Semester, Spring 2009 [retrieved on Feb. 25, 2020]. Retrieved from <https://pdfs.semanticscholar.org/3782/eefad91a3fdeac6b457a7a4b6915b512c967.pdf> (Year: 2009).*

Adams, B. et al., "Adaptively sampled particle fluids," ACM Transactions on Graphics (TOG), vol. 26, No. 3, ACM, 2007 (7 pages).

McAdams, A. et al., "A parallel multigrid Poisson solver for fluids simulation on large grids," Proceedings of the 2010 ACM SIGGRAPH/Eurographics Symposium on Computer Animation, Eurographics Association, 2010 (10 pages).

* cited by examiner

METHOD AND APPARATUS FOR MODELING A TARGET OBJECT BASED ON PARTICLES

CROSS-REFERENCE TO RELATED APPLICATION(S)

This application claims the benefit under 35 USC 119(a) of Korean Patent Application No. 10-2014-0145052, filed on Oct. 24, 2014, in the Korean Intellectual Property Office, the entire disclosure of which is incorporated herein by reference for all purposes.

BACKGROUND

1. Field

The following description relates to a method and apparatus for modeling a target object more quickly based on particles.

2. Description of Related Art

With respect to a fluid simulation in a computer graphics (CG) area, in particular, in a visual effects (VFX) area, research for digitizing a fluid movement is still in progress. A Navier-Stokes equation regards a fluid as a sum of minute particles, and represents interactions and movements between particles. When a fluid movement is digitally modeled, a computing load for modeling increases for a more realistic representation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of modeling a target object, the method including obtaining information about target particles corresponding to the target object, generating coarse particles by down-sampling the target particles, modeling a movement of the target object based on the coarse particles, and redefining the target particles based on a result of the modeling.

The generating may include generating each of the coarse particles based on at least one of a representative value, an average value, and a weighted sum with respect to attribute values of two or more of the target particles.

The generating may include generating a first coarse particle included in the coarse particles based on a set of the target particles positioned within a predetermined distance of each other.

The generating may include computing a weighted sum with respect to attribute values of the target particles included in the set of the target particles, and associating the weighted sum with the first coarse particle.

The generating may include selecting a first target particle of the target particles positioned within the predetermined distance value to be a representative particle, and generating the first coarse particle based on the representative particle.

The method of modeling a target object may further include associating an attribute value of the representative particle with the first coarse particle The generating may include spatially dividing the target particles based on a grid comprising a plurality of cells, and generating each of the coarse particles based on the target particles positioned in a respective cell of the grid.

The method of modeling a target object may further include associating with each of the coarse particles one or more average attribute values of the target particles positioned in the cell of the grid respective to the coarse particle.

Attribute values of the target particles may include at least one of a position, a velocity, a density, a pressure, and a temperature of the particles, and the generating of the coarse particles may be based on the attribute values of the target particles.

The modeling may include computing attribute values of the coarse particles based on the movement of the target object.

The redefining may include redefining each of the target particles based on a velocity value of a respective coarse particle.

The redefining may include computing for each of the coarse particles a velocity deviation between the coarse particle before the modeling of the movement of the target object and the coarse particle after the modeling of the movement of the target object, and redefining each of the target particles based on the velocity deviation of a respective coarse particle.

The redefining may include associating an attribute value of each of the coarse particles with its respective target particles.

The method of modeling a target object may further include generating a visualization of the target object based on the attribute values associated with the target particles.

The target object may include at least one of a fluid and a deformable body.

In another general aspect, there is provided an apparatus for modeling a target object, the apparatus including a memory configured to record a program controlling an operation of the apparatus for modeling the target object, a processor configured to execute the program, where the program is configured to obtain information about the target object including an arrangement of particles including target particles, model a movement of the target object based on coarse particles generated by down-sampling the target particles, and redefine the target particles based on a result of the modeling.

The program may be configured to generate each of the coarse particles based on at least one of a representative value, an average value, and a weighted sum with respect to attribute values of two or more of the target particles.

The program may be configured to generate a first coarse particle included in the coarse particles based on a set of the target particles positioned within a predetermined distance of each other, or configured to spatially divide the target particles based on a grid comprising a plurality of cells and generate each of the coarse particles based on the target particles positioned in a respective cell of the grid.

The program may be configured to redefine each of the target particles based on a velocity value of a respective coarse particle, or redefine each of the target particles based on a velocity deviation computed between a respective coarse particle before the modeling of the movement of the target object and the respective coarse particle after the modeling of the movement of the target object.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Figure 1:
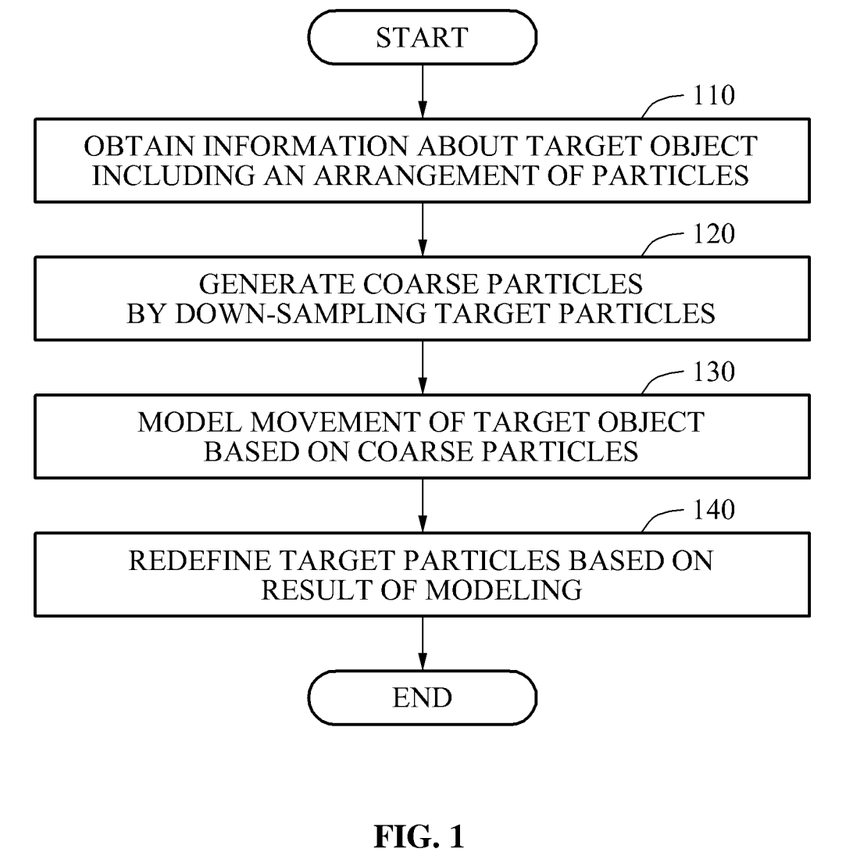
FIG. 1 is a flowchart illustrating an example of a method of modeling a target object based on particles.

FIG. 1 is a flowchart illustrating an example of a method of modeling a target object based on particles.

Referring to FIG. 1, in operation 110, an apparatus for modeling a target object (hereinafter, a "modeling apparatus") obtains information about the target particles corresponding to the target object. The target object may include an arrangement of particles including the target particles. The arrangement of particles, including attribute values for the particles, may be determined by the modeling apparatus based on received information describing the target object. The target object may include at least one of a fluid and a deformable body. The deformable body may be understood as including all forms of rigid and soft bodies.

In operation 120, the modeling apparatus generates coarse particles by down-sampling the target particles defining the target object. In operation 130, the coarse particles generated in operation 120 are used for modeling a movement of the target object under low resolution conditions with the number of coarse particles being smaller than the number of target particles. In some cases, the definition of the target object may include target particles that do not have corresponding coarse particles. In some cases, a coarse particle may be generated based on two or more particles. In some cases, a coarse particle may be generated based on a single particle.

The modeling apparatus may generate each of the coarse particles based on, for example, at least one of a representative value, an average value, and a weighted sum with respect to attribute values of two or more of the target particles. However, in some instances, based on the arrangement of the target particles, an individual coarse particle may be generated based on attribute values of a single target particle.

An example of generating coarse particles by the modeling apparatus will be described with reference to FIGS. 2 and 3.

In operation 130, the modeling apparatus models the movement of the target object based on the coarse particles generated in operation 120. Based on the coarse particles, the modeling apparatus may model the movement of the target object using techniques including, but not limited to, a position-based framework or a smoothed particle hydrodynamic (SPH). The modeling apparatus may compute attribute values of the coarse particles based on the movement of the target object.

Attribute values of particles may include, but are not limited to, a position, a velocity, a density, a pressure, and a temperature. Each of target particles as well as coarse particles may have an attribute value. The modeling apparatus may associate computed attribute values with the coarse particles. An example method of modeling a movement of a target object by the modeling apparatus will be described with reference to FIG. 4.

In operation 140, the modeling apparatus redefines the target particles based on a result of the modeling.

The modeling apparatus may redefine the target particles corresponding to the coarse particles based on velocity values of the coarse particles according to the modeling. By way of example, the target particles corresponding to the coarse particles may refer to target particles used for inversely generating a single coarse particle in the event that coarse particles are generated for each of sets 311, 312, 313, and 314 of original particles 310 of FIG. 3.

Also, the modeling apparatus may compute for each coarse particle a velocity change between the coarse particle before the modeling of the movement of the target object in operation 130 and the coarse particle after the modeling of the movement of the target object, and redefine each of the target particle based on the computed velocity change of its respective coarse particle. An example method of redefining original particles by the modeling apparatus will be described with reference to FIGS. 5 and 6.

In view of this disclosure, one of ordinary skill in the art would understand that the example method illustrated in FIG. 1 may be performed iteratively. In a first example, operation 130 may be performed iteratively to model multiple movements of the target object based on the coarse particles, with operation 140 performed after the iterations of operation 130. In a second example, operations 120 through 140 may be performed iteratively, where after operation 140 redefines the target particles the method returns to operation 120 to generate new coarse particles based on the redefined target particles. This may yield over the course of multiple iterations a more detailed and/or accurate modeling of the movements of the target object than the first example. Other variations on iterating operations 110 through 140 may be implemented by one of ordinary skill in view of this disclosure.

Figure 2:
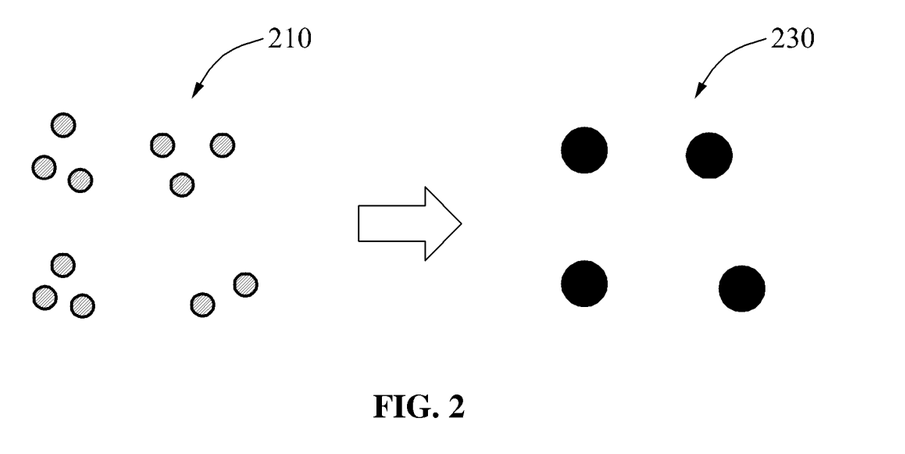
FIG. 2 is a diagram illustrating an example of coarse particles generated by down-sampling original particles.

FIG. 2 is a diagram illustrating an example of coarse particles generated by down-sampling original particles.

Referring to FIG. 2, target particles 210 defining a target object and coarse particles 230 generated by down-sampling the original particles 210 are illustrated. Although two-dimensional arrangements of particles are illustrated in FIGS. 2-6 for the purpose of explanation, the techniques described in this disclosure may be applied to particles arranged in two, three, or more dimensions, and such applications are within the skills of one of ordinary skill in the art in view of this disclosure.

For example, a plurality of target particles 210 configuring the target object may be arranged in a predetermined space, and a set of the target particles 210 may be positioned within a predetermined distance of each other. In some cases, such sets may only include one target particle 210. The target particles 210 may each have associated attribute values, for example, information associated with a position, a velocity, a density, a pressure, a temperature, and the like that may be used for modeling the target particles 210. The attribute values of the target particles 210 are transferred to the coarse particles 230 through one of a number of down-sampling techniques.

The target particles 210 are down-sampled to generate a lower number of coarse particles 230. For example, FIG. 2 illustrates an example in which twelve target particles 210 are down-sampled to generate four coarse particles 230. For example, the coarse particles 230 may be generated by combining a set of the target particles 210 positioned within a predetermined distance of each other, or by selecting representative particles from among the target particles 210. In some cases, some of the coarse particles 230 may be generated according to a first technique, and others of the coarse particles 230 may be generated according to a second technique.

Attribute values of the coarse particles 230 may be obtained, for example, based on an average value, a weighted sum, or a representative value with respect to the attribute values of two or more target particles 210. An effect of using the average value, the weighted sum, and the representative value with respect to the attribute values of the target particles 210 as attribute values of the coarse particles 230 may be similar to an effect of using a low pass filter. Some examples of generating coarse particles 230 from the target particles 210 according to various techniques will be described with reference to FIG. 3.

The modeling apparatus may globally decrease and coarsely down-sample an original number of target particles 210 defining a target object into a smaller number of coarse particles 230, thereby decreasing an amount of computation for modeling the target object.

Also, the modeling apparatus may use the smaller number of particles for modeling a movement of the target object, yet maintain the original number of particles for generating a visualization of the target object after the modeling, thereby maintaining a higher visual resolution.

Figure 3A:
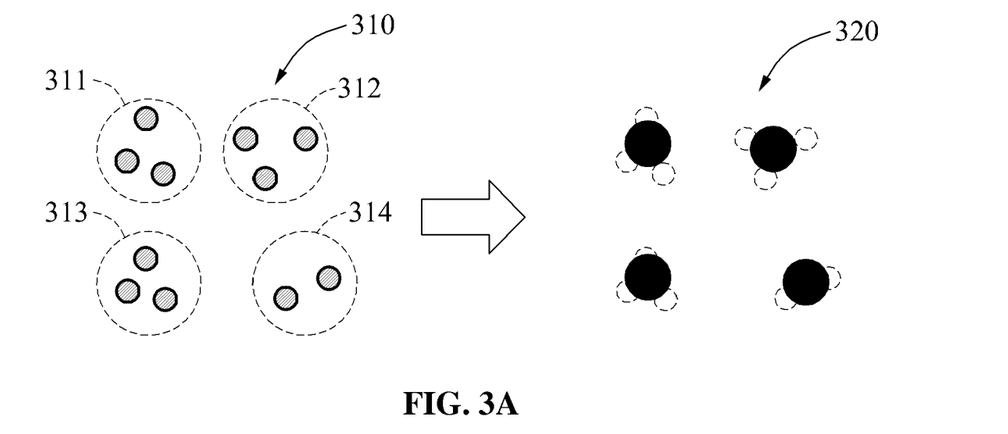
FIGS. 3A-3C are diagrams illustrating examples of various methods of generating coarse particles.
Figure 3B:
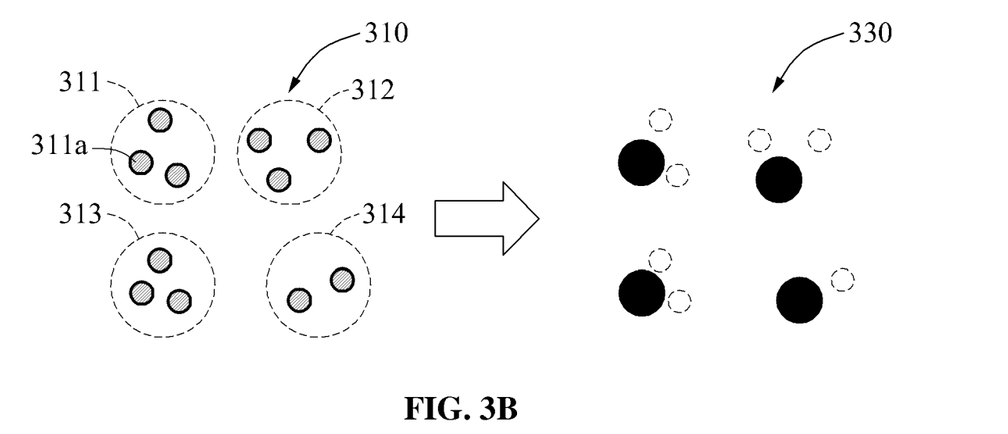
Figure 3C:
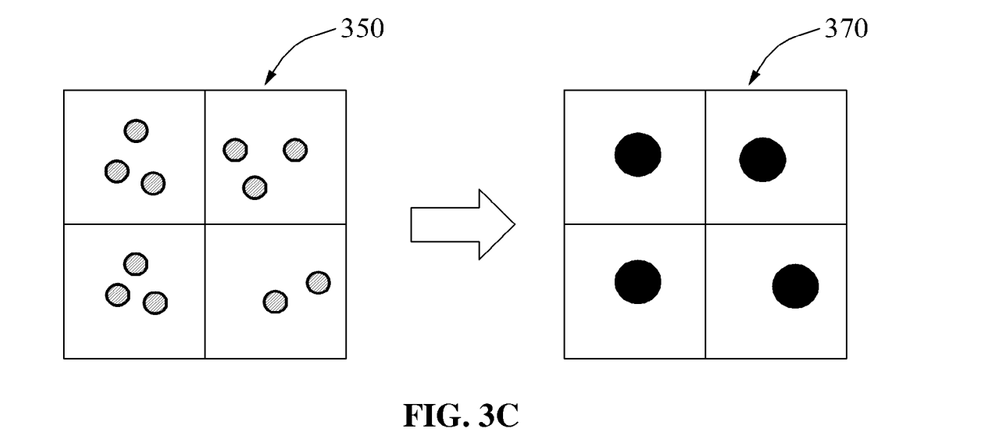

FIGS. 3A-3C are diagrams illustrating examples of various methods of generating coarse particles. FIG. 3A illustrates a first example of generating coarse particles 320 from target particles 310. FIG. 3B illustrates a second example of generating coarse particles 330 from target particles 310. FIG. 3C illustrates a third example of generating coarse particles 370 from target particles 350.

FIGS. 3A and 3B relate to generating coarse particles by combining sets of particles where in each set the particles are positioned within a predetermined distance of each other. FIG. 3C relates to generating coarse particles by dividing a space in which the particles are arranged based on a grid, and combining particles located in each space, for example, each cell, of the dividing grid.

Coarse particles may be generated based on a weighted sum to combine particles.

To generate a coarse particle, the modeling apparatus may combine target particles positioned within a predetermined distance value, for example, 1 millimeter (mm), of each other among the target particles 310 arranged in a predetermined area or volume. For example, in FIG. 3A, based on each of the sets 311, 312, 313, and 314 of target particles being positioned within 1 mm among the target particles 310, four coarse particles 320 are each generated by combining all of the target particles included in each respective set 311, 312, 313, and 314.

Attribute values of each of the coarse particles 320 may be a weighted sum with respect to attribute values of the target particles 310 included in respective sets 311, 312, 313, and 314. Each of the target particles 310 may have a kernel function, whereby, for example, a nearby particle may exert a relatively large influence on a target particle's attribute value, whereas a more distant particle may exert a relatively small influence on the target particles' attribute value.

FIG. 3B illustrates an example in which the modeling apparatus identifies sets 311, 312, 313, and 314, as discussed above for FIG. 3A, and then selects a single representative target particle from each of the sets 311, 312, 313, and 314 to generate respective coarse particles 330. For example, in FIG. 3B, target particle 311a has been selected as a representative particle from set 311. The modeling apparatus may determine a representative particle using, for example, a method of selecting a target particle having a highest frequency or selecting a target particle having a lowest frequency. A particle having a high frequency has a relative small movement, in other words, has a detailed movement. A particle having a low frequency has a relatively large movement. For example, a small ripple formed on the surface of water by a water strider may be considered as a high frequency and a big water movement, such as a tsunami or a tidal wave, may be considered as a low frequency.

In the example illustrated in FIG. 3C, the modeling apparatus divides a space in which target particles 310 are arranged into a plurality of cells based on a grid and generates a coarse particle 370 from the target particles for each divided cell containing one or more target particles.

In the example illustrated in FIG. 3C, coarse particles 370 are generated in a manner similar to the technique described for FIG. 3A, based on a weighted sum or an average value to combine particles in a single cell. Each of the target particles 310 may have a kernel function and, in some examples, a target particle 310 outside of a cell may exert an influence on an attribute value of a target particle 310 inside of the cell for generating a corresponding course particle 370. In some examples, a representative target particle may be selected from each cell, much as described for FIG. 3B.

Additionally, one of ordinary skill in the art would understand in view of this disclosure that in some examples, the above described techniques for generating a course particle from two or more target particles may be combined on an attribute-by-attribute basis. For example, a representative particle may be selected for a first attribute value of a coarse particle, and a second attribute value of the same coarse particle may be based on a weighted sum or an average value. As a specific example, a representative target particle may be selected for determining a position of a course particle, while a velocity of the same coarse particle is based on a weighted sum of the velocity attribute values of its associated target particles.

Figure 4:
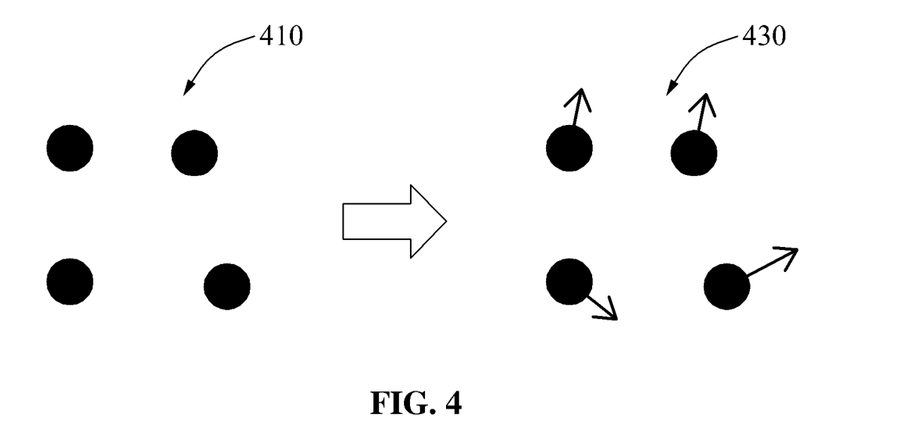
FIG. 4 is a diagram illustrating an example of a method of modeling a movement of a target object.

FIG. 4 is a diagram illustrating an example of a method of modeling a movement of a target object.

Referring to FIG. 4, coarse particles 410 generated as discussed above and coarse particles 430 to model a movement of a target object are illustrated.

The modeling apparatus models the movement of the target object, such as water, fire, smoke, a rigid body, and a deformable body, based on attribute values, such as a position, a velocity, a density, a pressure, a temperature, and the like, of the coarse particles 410. The movement of the target object may be computed using techniques including, but not limited to, a position-based framework or a smoothed particle hydrodynamic (SPH).

Since the modeling apparatus computes the movement of the target object based on the coarse particles 410, the modeled coarse particles 430 may be represented using a low resolution.

Figure 5:
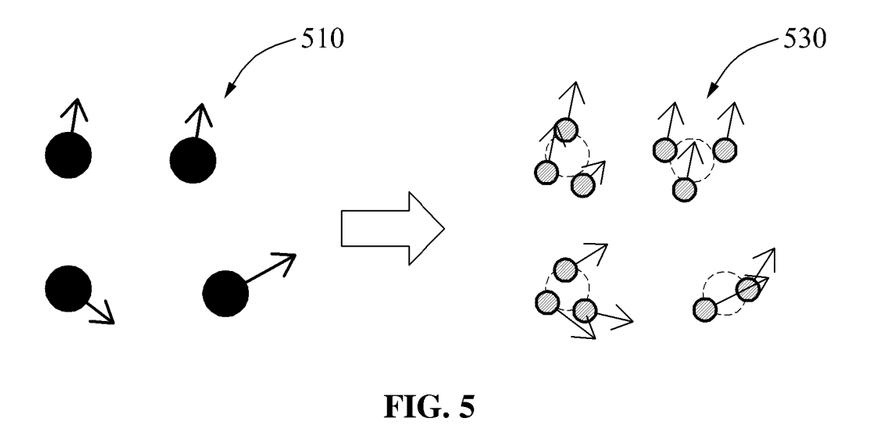
FIG. 5 is a diagram illustrating an example of a method of redefining target particles based on a result of modeling coarse particles generated based on a weighted sum.

FIG. 5 is a diagram illustrating an example of a method of redefining target particles based on a result of modeling coarse particles generated based on a weighted sum.

Referring to FIG. 5, coarse particles 510 generated based on the weighted sum and target particles 530 redefined based on a result of modeling the coarse particles 510 are illustrated.

In this example, a modeling apparatus computes a movement of the coarse particles 510 based on their attribute values, and redefines the target particles 530 by retransferring attribute values for coarse particles 510 resulting from the computing of the movement to the target particles 530.

The attribute values of the redefined target particles 530 may be, for example, determined based on attribute values of the coarse particles 510 positioned closest to the redefined target particles 530, or by using a method of dividing a weighted sum with respect to the coarse particles 510 in proximity to the redefined original particles 530 in proportion to a distance.

In a case of a velocity of particles, the modeling apparatus may redefine the target particles 530 corresponding to the coarse particles 510 by applying a value, for example, a velocity value, associated with the coarse particles 510. When the value, for example, the velocity value, associated with the coarse particles 510 is applied without being changed, the modeling apparatus may smoothly represent the movement of the target object with reduced detail, similar in respects to a case in which a low pass filter is used.

The modeling apparatus may redefine the target particles 530 by applying, to the target particles 530, a difference between, or change in, a velocity of the coarse particles 510 before modeling a movement of the target object and a velocity of the coarse particles 510 after the modeling. For example, the modeling apparatus may redefine each target particle 530 by applying a difference between, or change in, a velocity of the target particle's corresponding coarse particle 510 before modeling and a velocity of the corresponding coarse particle 510 after the modeling. The modeling apparatus may compute a velocity deviation between the coarse particles 510 before modeling a movement of the target object and the coarse particles 510 after the modeling, and redefine the target particles 530 corresponding to the coarse particles 510 by applying a result of the computation. For example, the modeling apparatus may redefine each target particle 530 by applying a velocity deviation between the target particle's corresponding coarse particle 510 before modeling and after the modeling.

When the difference or deviation between the coarse particles 510 before modeling and after modeling is applied to the target particles 530, more of the detail of the target particle 530 may be maintained, thereby representing movement of the target particles 530 in a more detailed manner.

Figure 6:
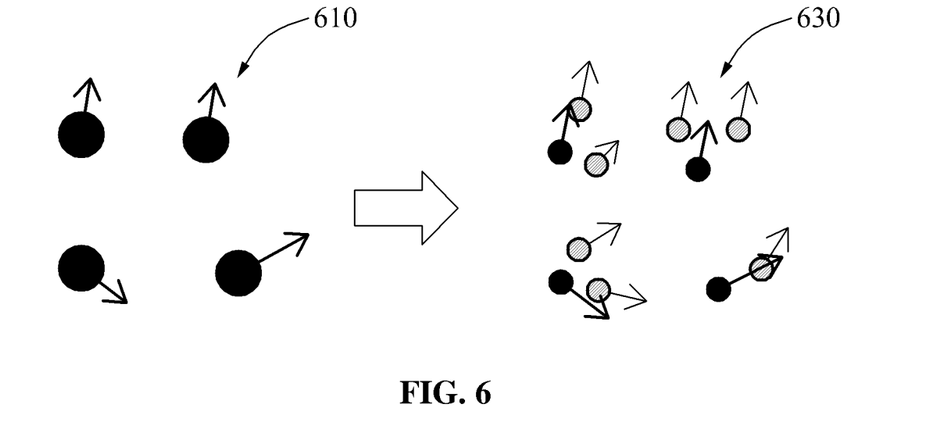
FIG. 6 is a diagram illustrating an example of a method of redefining target particles based on a result of modeling coarse particles generated based on a representative particle.

FIG. 6 is a diagram illustrating an example of a method of redefining target particles based on a result of modeling coarse particles generated based on a representative particle.

Referring to FIG. 6, coarse particles 610 generated based on representative particles, for example, as discussed with respect to FIG. 3B, and target particles 630 redefined based on the coarse particles 610 are illustrated. As an example, not illustrated in FIG. 6, the modeling apparatus may redefine the target particles 630 by identically transferring attribute values associated with the coarse particles 610 to the target particles 630. For example, the modeling apparatus may use attribute values of the coarse particles 610 generated based on representative particles, as attribute values of the redefined target particles 630 without being changed.

The modeling apparatus may redefine the target particles 630 corresponding to the coarse particles 610 based on a velocity difference or deviation between the coarse particles 610 before modeling a movement of a target object and the coarse particles 610 after the modeling, much as previously discussed with respect to FIG. 5.

Figure 7:
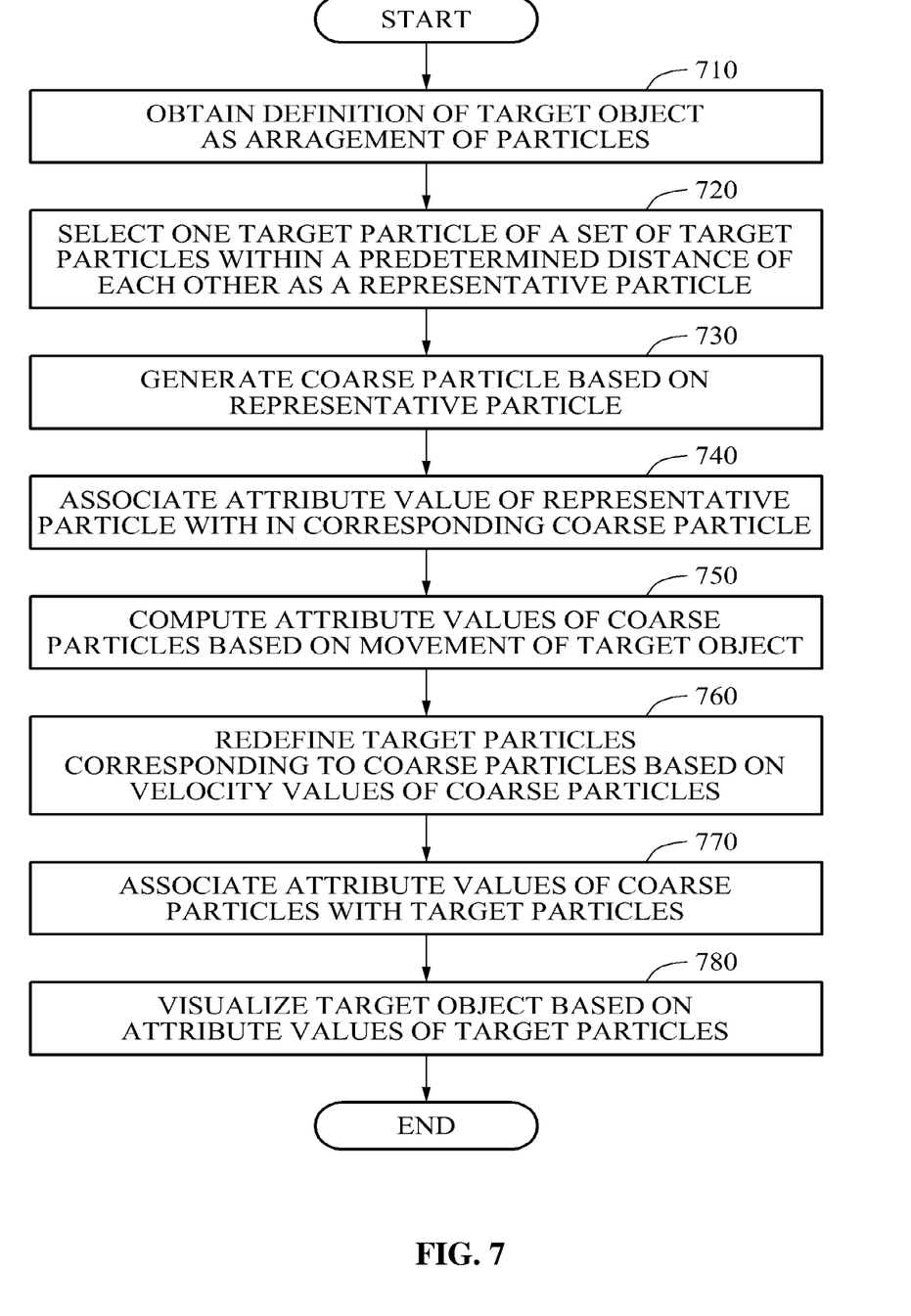
FIG. 7 is a flowchart illustrating another example of a method of modeling a target object based on particles.

FIG. 7 is a flowchart illustrating another example of a method of modeling a target object based on particles.

Referring to FIG. 7, in operation 710, a modeling apparatus obtains information about the target object including an arrangement of particles including target particles. The arrangement of particles, including attribute values for the particles, may be determined by the modeling apparatus based on received information describing the target object.

In operation 720, the modeling apparatus selects one target particle of a set of the target particles positioned within a predetermined distance value of each other as a representative particle.

In operation 730, the modeling apparatus generates a coarse particle based on the representative particle determined in operation 720. In operation 740, the modeling apparatus associates an attribute value of the representative particle with its corresponding coarse particle. A plurality of representative particles and coarse particles may be selected and generated for the target object, and attribute values associated with the coarse particles, as described for operations 720 to 740.

In operation 750, the modeling apparatus computes attribute values, for example, velocity values, of the coarse particles based on a modeled movement of the target object.

In operation 760, the modeling apparatus redefines target particles corresponding to the coarse particles based on the velocity values of the coarse particles computed in operation 750.

In operation 770, the modeling apparatus associates the attribute values of the coarse particles according to the modeling with the target particles.

In operation 780, the modeling apparatus generates a visualization of the target object based in the attribute values of the target particles. In some examples, the visualization may be displayed on a display device.

In view of this disclosure, one of ordinary skill in the art would understand that the example method illustrated in FIG. 7 may be performed iteratively. In a first example, operation 750 may be performed iteratively to model multiple movements of the target object based on the coarse particles, with operation 760 performed after the iterations of operation 750. In a second example, operations 720 through 770 may be performed iteratively, where after operation 770 updates attribute values of the target particles the method returns to operation 720 to generate new coarse particles based on the redefined target particles. This may yield over the course of multiple iterations a more detailed and/or accurate modeling of the movements of the target object than the first example. Operation 780 may be included in the iterations to generate intermediate visualizations of the target object as it goes through multiple movements. Other variations on iterating operations 710 through 780 may be implemented by one of ordinary skill in view of this disclosure.

Figure 8:
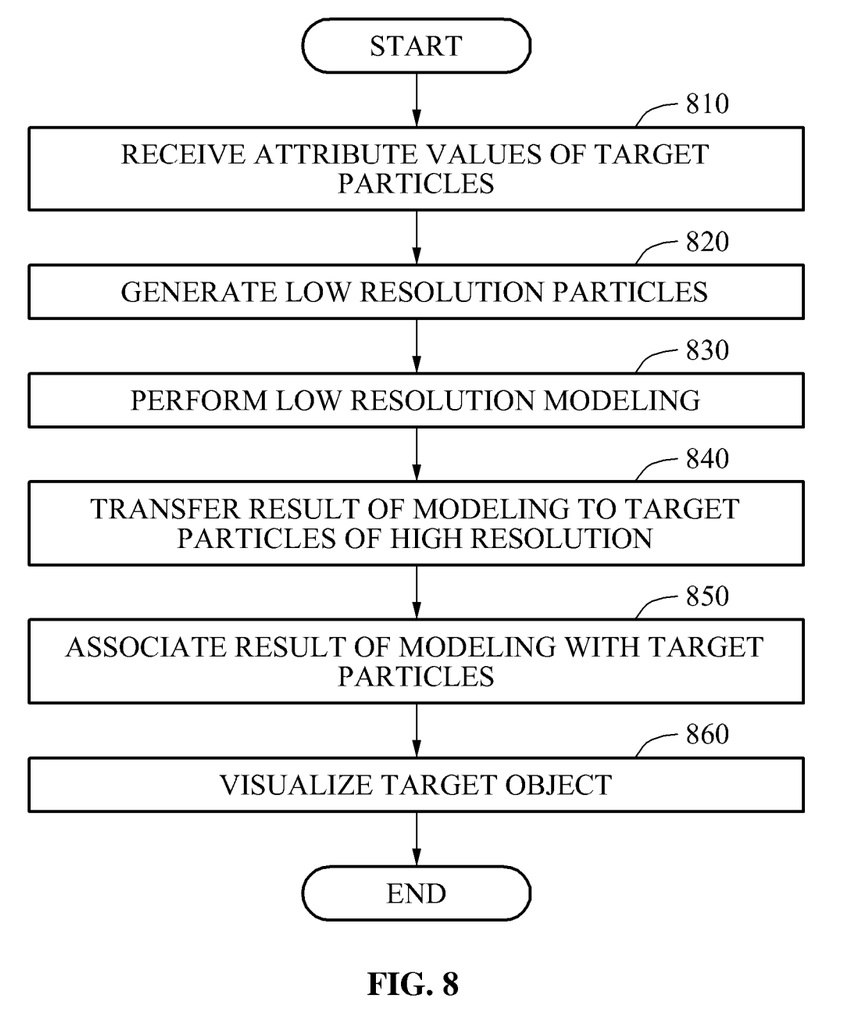
FIG. 8 is a flowchart illustrating still another example of a method of modeling a target object based on particles.

FIG. 8 is a flowchart illustrating still another example of a method of modeling a target object based on particles.

Referring to FIG. 8, in operation 810, a modeling apparatus receives attribute values of target particles.

In operation 820, the modeling apparatus generates low resolution particles. The modeling apparatus may generate the low resolution particles by globally down-sampling the target particles. The generated low resolution particles may refer to coarse particles. In operation 820, the modeling apparatus may compute the attribute values of the coarse particles based on the attribute values of the target particles received in operation 810.

In operation 830, the modeling apparatus performs a low resolution modeling. In operation 830, the modeling apparatus may compute the movement of the target object, such as a fluid, a rigid body, a deformable body, and the like, based on the attribute values of the coarse particles. The movement of the target object may be computed using techniques including, but not limited to, a position-based framework or a smoothed particle hydrodynamic (SPH).

In operation 840, the modeling apparatus transfers a result of the low resolution modeling to the target particles, which define the target object at a higher resolution. In operation 840, the attribute values of the coarse particles computed through operation 830 are transferred to the more densely distributed target particles of high resolution. Examples of such transfer are described above with respect to FIGS. 5 and 6.

In operation 850, the modeling apparatus stores the result of modeling. The modeling apparatus may associate with the target particles the attribute values of the coarse particles transferred to the target particles.

In operation 860, the modeling apparatus generates a visualization of the target object based on the target particles to which the attribute values of the coarse particles were transferred in operation 850. In some examples, the visualization may be displayed on a display device.

In view of this disclosure, one of ordinary skill in the art would understand that the example method illustrated in FIG. 8 may be performed iteratively. In a first example, operation 830 may be performed iteratively to model multiple movements of the target object based on the coarse particles, with operation 840 performed after the iterations of operation 830. In a second example, operations 820 through 850 may be performed iteratively, where after operation 850 updates attribute values of the target particles the method returns to operation 820 to generate new coarse particles based on the redefined target particles. This may yield over the course of multiple iterations a more detailed and/or accurate modeling of the movements of the target object than the first example. Operation 860 may be included in the iterations to generate intermediate visualizations of the target object as it goes through multiple movements. Other variations on iterating operations 810 through 860 may be implemented by one of ordinary skill in view of this disclosure.

Figure 9:
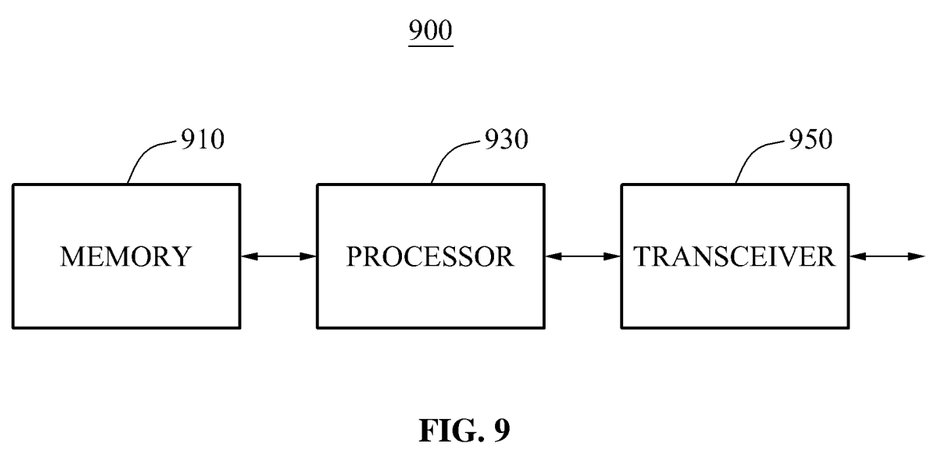
FIG. 9 is a structural diagram illustrating an example of an apparatus for modeling a target object based on particles.

FIG. 9 is a structural diagram illustrating an example of an apparatus for modeling a target object based on particles.

Referring to FIG. 9, a modeling apparatus 900 includes a memory 910 and a processor 930. Also, the modeling apparatus 900 further includes a transceiver 950.

The memory 910 is configured to record a program controlling an operation of the modeling apparatus 900. The memory 910 may also store data used by the program, including attribute values for target particles or coarse particles. The memory 910 may include volatile and/or nonvolatile memory elements.

The processor 930 is configured to execute the program stored in the memory 910. A number of the processors 930 may be singular or plural.

The program is configured to model a movement of the target object based on coarse particles generated by down-sampling target particles defining the target object. The program may be further configured to determine an initial arrangement of the target particles, including attribute values for the target particles, based on information describing the target object. The program is further configured to redefine the target particles based on a result of the modeling.

The program is configured to generate the coarse particles based on at least one of a representative value, an average value, and a weighted sum with respect to attribute values of the target particles.

The program may be configured to generate the coarse particles based on sets of the target particles where in each set the target particles are positioned within a predetermined distance of each other. The program may be configured to spatially divide the target particles based on a grid including a plurality of cells, and generate the coarse particles based on the target particles included in each cell of the divided grid.

Also, the program may be configured to redefine the target particles corresponding to the coarse particles based on velocity values of the coarse particles according to the modeling. The program may be configured to redefine the target particles corresponding to the coarse particles based on a velocity difference or deviation computed between the coarse particles before modeling the movement of the target object, and the coarse particles after the modeling the movement of the target object.

A transceiver 950 may be controlled by the processor 930, and can transmit and receive information required for executing the program. In some examples, processor 930 may utilize the transceiver 950 to receive attribute values of the target particles defining the target object, or transmit attribute values of the coarse particles.

The various modules, elements, and methods described above may be implemented using one or more hardware components, one or more software components, or a combination of one or more hardware components and one or more software components.

Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of modeling a target object, the method comprising:
    obtaining attribute values of each target particle of a plurality of target particles corresponding to the target object;

generating a coarse particle by combining sets of target particles where in each set the target particles are positioned within a predetermined distance of each other, wherein course attribute values of the coarse particle are generated based on a weighted sum with respect to attribute values of the target particles included in respective sets;

modeling a movement of the target object based on the coarse particle to generate updated coarse attribute values of the coarse particle;

redefining the target particles of the set based on a result of the modeling, by identically transferring the updated attribute values of the coarse particle to the target particles of the set; and generating a visualization of the target object based on the updated attribute values transferred to the target particles of the set.

2. The method of claim 1, wherein the generating of the coarse particle comprises generating the coarse particle based on any one or any combination of any two or more of a representative value, an average value, or a weighted sum with respect to attribute values of two or more of the target particles of the set.

3. The method of claim 1, wherein the target particles of the set are target particles positioned within a predetermined distance of each other.

4. The method of claim 3, wherein the generating of the coarse particle comprises:

computing a weighted sum with respect to attribute values of the target particles included in the set of the target particles; and associating the weighted sum with the coarse particle.

5. The method of claim 1, wherein the generating of the coarse particle comprises:

spatially dividing the plurality of target particles based on a grid comprising a plurality of cells, wherein the set of target particles are target particles positioned in a first cell of the grid.

6. The method of claim 5, further comprising:

associating, with the coarse particle, one or more average attribute values of the target particles positioned in the first cell of the grid.

7. The method of claim 1, wherein the attribute values of each target particle of the plurality of target particles comprise any one or any combination of any two or more of a position, a velocity, a density, a pressure, or a temperature of the respective target particle, and the generating of the coarse particle is based on the attribute values of the target particles of the set.

8. The method of claim 1, wherein the modeling comprises computing attribute values of the coarse particle based on the movement of the target object.

9. The method of claim 1, wherein the redefining comprises redefining each of the target particles of the set based on a velocity value of the coarse particle resulting from the calculation of the movement of the coarse particle.

10. The method of claim 1, wherein the redefining comprises:

redefining the target particles by applying the course attribute values of the coarse particle to the attribute values of the target particles based on distance between the target particles and the coarse particle; or redefining the target particles by applying to the target particles a velocity deviation between the coarse particles before modeling the movement of the target object and the coarse particles after modeling the movement of the target object.

11. The method of claim 1, wherein the target object comprises either one or both of a fluid or a deformable body.

12. The method of claim 1, wherein:

the coarse attribute values of the coarse particle are generated based on either a weighted sum or an average value of two or more target particles.

13. A non-transitory computer-readable storage medium comprising a program comprising instructions to cause a computer to perform the method of claim 1.

14. An apparatus for modeling a target object, the apparatus comprising:

a memory configured to record a program controlling an operation of the apparatus for modeling the target object; and a processor configured to execute the program, wherein the program is configured to obtain information about the target object including an arrangement of a plurality of target particles, each target particle comprising attribute values, generate a coarse particle by combining sets of target particles where in each set the target particles are positioned within a predetermined distance of each other, wherein course attribute values of the coarse particle are generated based on a weighted sum with respect to attribute values of the target particles included in respective sets, model a movement of the target object based on the coarse particle to generate updated coarse attribute values of the coarse particle, redefine the target particles of the set based on a result of the modeling, by identically transferring the updated attribute values of the coarse particle to the target particles of the set; and generate a visualization of the target object based on the updated attribute values transferred to the target particles of the set.

15. The apparatus of claim 14, wherein the processor is further configured to generate the coarse particle based on any one or any combination of a representative value, an average value, or a weighted sum with respect to attribute values of two or more of the target particles of the set.

16. The apparatus of claim 14, wherein the target particles of the set are target particles positioned within a predetermined distance of each other, or are target particles in a first cell of a grid generated by spatially dividing the plurality of target particles.

17. The apparatus of claim 14, wherein the processor is further configured to redefine each of the target particles of the set based on a velocity deviation value of the coarse particle before and after modeling of the movement of the target object, or to redefine the target particles by applying the course attribute values of the coarse particle to the attribute values of the target particles based on the distance between the target particles and the coarse particle.

* * * * *